US010637302B2

(12) United States Patent
Hoque et al.

(10) Patent No.: US 10,637,302 B2
(45) Date of Patent: Apr. 28, 2020

(54) WIRELESS POWER TRANSMISSION DEVICE AND WIRELESS CHARGING SYSTEM, AND METHOD OF CONTROLLING THE SAME

(71) Applicant: Samsung Electronics Co., Ltd., Suwon-si, Gyeonggi-do (KR)

(72) Inventors: Mohammad Anwarul Hoque, Dacca (BD); Mahbubur Rahman, Dacca (BD); Mohammad Tawhidul Islam Chowdhury, Dacca (BD); Kazy Fayeen Shariar, Dacca (BD); Sardar Muhammad Monzurur Rahman, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 15/212,784

(22) Filed: Jul. 18, 2016

(65) Prior Publication Data

US 2017/0201132 A1  Jul. 13, 2017

(30) Foreign Application Priority Data

Jan. 11, 2016  (KR) ........................ 10-2016-0003140

(51) Int. Cl.
*H02J 50/15* (2016.01)
*H02J 50/90* (2016.01)
*H02J 50/80* (2016.01)
*H02J 7/02* (2016.01)

(52) U.S. Cl.
CPC .............. *H02J 50/90* (2016.02); *H02J 7/025* (2013.01); *H02J 50/15* (2016.02); *H02J 50/80* (2016.02)

(58) Field of Classification Search
CPC .. H02J 50/00; H02J 50/10; H02J 50/15; H02J 50/40; H02J 50/50; H02J 50/60; H02J 50/70; H02J 50/80; H02J 50/90; H02J 7/025
USPC ........................................... 320/108; 307/104
See application file for complete search history.

(56) References Cited

U.S. PATENT DOCUMENTS

| 6,798,716 | B1 | 9/2004 | Charych |
| 2007/0109121 | A1 | 5/2007 | Cohen |
| 2008/0265835 | A1 | 10/2008 | Reed et al. |
| 2010/0079012 | A1* | 4/2010 | Hyde ...................... H02J 17/00 307/149 |
| 2010/0164433 | A1 | 7/2010 | Janefalkar et al. |

(Continued)

FOREIGN PATENT DOCUMENTS

| EP | 2 700 530 A1 | 2/2014 |
| KR | 10-2009-0027312 A | 3/2009 |
| WO | 2015/190858 A2 | 12/2015 |

*Primary Examiner* — Nathaniel R Pelton
*Assistant Examiner* — Michael N Dibenedetto
(74) *Attorney, Agent, or Firm* — Jefferson IP Law, LLP

(57) ABSTRACT

A wireless power transmission device and a method for controlling the same are provided. The method includes receiving a charging request from an external apparatus using radio communication, determining a direction in which the external apparatus is positioned, determining a distance between the wireless power transmission device and the external apparatus, and transmitting an ultrasonic signal to the external apparatus based on the direction in which the external apparatus is positioned and the distance between the wireless power transmission device and the external apparatus.

20 Claims, 17 Drawing Sheets

(56) References Cited

U.S. PATENT DOCUMENTS

| | | |
|---|---|---|
| 2012/0155220 A1 | 6/2012 | Lee et al. |
| 2012/0303980 A1 | 11/2012 | Culbert et al. |
| 2013/0241308 A1 | 9/2013 | Bilbrey et al. |
| 2013/0241474 A1* | 9/2013 | Moshfeghi ............ H02J 7/0027 320/108 |
| 2013/0271088 A1 | 10/2013 | Hwang et al. |
| 2014/0002013 A1 | 1/2014 | Kossi et al. |
| 2015/0003207 A1 | 1/2015 | Lee et al. |
| 2015/0091498 A1 | 4/2015 | Abdelmoneum et al. |
| 2015/0280484 A1* | 10/2015 | Radziemski ............ H02J 7/025 320/108 |
| 2015/0333529 A1* | 11/2015 | Leabman ................ H02J 50/40 307/104 |
| 2015/0333800 A1 | 11/2015 | Perry et al. |
| 2016/0028265 A1* | 1/2016 | Bell ........................ H02J 7/025 320/108 |
| 2016/0126779 A1* | 5/2016 | Park ........................ H02J 50/80 320/108 |
| 2016/0181856 A1* | 6/2016 | Lee ......................... H02J 17/00 320/108 |

\* cited by examiner

10

100

150

200

WIRELESS POWER TRANSMISSION DEVICE AND WIRELESS CHARGING SYSTEM, AND METHOD OF CONTROLLING THE SAME

CROSS-REFERENCE TO RELATED APPLICATIONS

This application claims the benefit under 35 U.S.C. § 119(a) of a Korean patent application filed on Jan. 11, 2016 in the Korean Intellectual Property Office and assigned Serial No. 10-2016-0003140, the entire disclosure of which is hereby incorporated by reference.

TECHNICAL FIELD

The present disclosure relates to a wireless power transmission device and a wireless charging system, and a method for controlling the same. More particularly, the present disclosure relates to a wireless power transmission device and a wireless charging system, and a method for controlling the same, for determining a direction and distance of an external apparatus and transmitting an ultrasonic signal to an external apparatus so as to enable wireless charging.

BACKGROUND

The technical field of wireless power transmission technologies includes a method using radio frequency (RF) and a method using a magnetic field. Among these, examples of the method using a magnetic field include a magnetic field induction-based contactless power transmission method, a magnetic field beam shaping-based short-distance power transmission method, and a magnetic field resonance-based short-distance power transmission method.

Technologies using a contactless method have been gradually used with portable electronic devices, portable terminals, rechargeable pads, and so on, in accordance with current trends. In the future, technologies are expected to be applied to more portable devices, but there is a problem in that a power transmission distance is very short. In addition, magnetic field resonance-based wireless power transmission technologies are designed in such a way that a transmitter and a receiver resonate with each other to significantly enhance transmission efficiency but are disadvantageous in that transmission efficiency is rapidly reduced as a distance between a transmitter and a receiver is increased.

The method using RF is based on a technology that is currently and significantly widely used in forms such as radio frequency identification (RFID) and requires a physiological approach in the future because a problem in terms of very low maximum power transmission rating is not overcome and maleficence is not proved in a clinical test and a verification test. Since the magnetic field beam shaping-based short-distance power transmission method uses ferrite, the method can be applied to an electric vehicle, an electric rail car, or the like due to a large size and weight, but it is disadvantageous that the method cannot be easily applied to a portable small-sized electronic device.

Accordingly, there is a need for a wireless charging system that has enhanced efficiency and directivity and is harmless to humans.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wireless power transmission device and a wireless charging system, and a method for controlling the same.

Another aspect of the present disclosure is to provide a wireless power transmission device and a method for controlling the same, for determining a direction and distance of an external apparatus that requests charging, and transmitting an ultrasonic signal to the external apparatus based on the determined distance and distance of the external apparatus.

In accordance with an aspect of the present disclosure, a method of controlling a wireless power transmission device using an ultrasonic wave is provided. The method includes receiving a charging request from an external apparatus using radio communication, determining a direction in which the external apparatus is positioned, determining a distance between the wireless power transmission device and the external apparatus, and transmitting an ultrasonic signal to the external apparatus based on the direction in which the external apparatus is positioned and the distance between the wireless power transmission device and the external apparatus.

The method may further include determining whether an object is present on a path for transmitting the ultrasonic signal, wherein, upon determining that the object is present on the path, transmission of the ultrasonic signal may be stopped.

The method may further include, when transmission of the ultrasonic signal is stopped, displaying a user interface (UI) indicating that transmission of the ultrasonic signal is stopped.

The determining of whether the object is present may include determining whether the object is present on the path when a backscattered signal is valid.

The transmitting may include transmitting an ultrasonic signal to the external apparatus when a distance with the external apparatus is within a preset value.

The determining may include determining the distance between the wireless power transmission device and the external apparatus using a time in which an ultrasonic signal generated from the wireless power transmission device reaches the external apparatus and a time in which an ultrasonic signal generated from the external apparatus reaches the wireless power transmission device.

The determining may include generating an ultrasonic wave at a plurality of transmitters and determining the direction in which the external apparatus is positioned using a difference in time periods in which the plurality of generated ultrasonic waves reaches the external apparatus.

The transmitting of the ultrasonic signal may include activating a converter arranged in a direction corresponding to the position of the external apparatus among a plurality of converter arranged in different directions to transmit an ultrasonic signal to the external apparatus.

The transmitting of the ultrasonic signal may include converting an electric signal into an ultrasonic signal.

The method may further include receiving state information of a plurality of external apparatus from the plurality of external apparatus, and displaying state information of each of the plurality of external apparatus in at least a partial region of a display.

In accordance with another aspect of the present disclosure, a wireless power transmission device using an ultrasonic wave is provided. The wireless power transmission device includes a communicator configured to wirelessly communicate with an external apparatus, an ultrasonic signal generator configured to generate an ultrasonic signal, and a controller configured to control the ultrasonic signal generator to, in response to a charging request being received from the external apparatus through the communicator, determine a direction in which the external apparatus is positioned, determine a distance between the wireless power transmission device and the external apparatus, and transmit an ultrasonic signal to the external apparatus based on the direction in which the external apparatus is positioned and the distance between the wireless power transmission device and the external apparatus.

The controller may control the ultrasonic signal generator to determine whether an object is present on a path for transmitting the ultrasonic signal, and upon determining that the object is present on the path, to stop transmission of the ultrasonic signal.

The wireless power transmission device may further include a display, wherein, when the controller controls the ultrasonic signal generator to stop transmission of the ultrasonic signal, the controller may control the display to display a UI indicating that transmission of ultrasonic signal is stopped.

The controller may determine whether a backscattered signal is valid, and determine that an object is present on the path when the backscattered signal is valid.

The controller may control the ultrasonic signal generator to transmit an ultrasonic signal to the external apparatus when the distance with the external apparatus is within a preset value.

The controller may determine the distance between the wireless power transmission device and the external apparatus using a time in which an ultrasonic signal generated from the wireless power transmission device reaches the external apparatus and a time in which an ultrasonic signal generated from the external apparatus reaches the wireless power transmission device.

The controller may generate an ultrasonic wave at a plurality of transmitters and determine the direction in which the external apparatus is positioned using a difference in time periods in which the plurality of generated ultrasonic waves reaches the external apparatus.

The controller may control the ultrasonic signal generator to activate a converter arranged in a direction corresponding to the position of the external apparatus among a plurality of converter arranged in different directions to transmit an ultrasonic signal to the external apparatus.

The ultrasonic signal generator may convert an electric signal into an ultrasonic signal to generate an ultrasonic signal.

The wireless power transmission device may further include a display, wherein the controller controls the display to display state information of each of a plurality of external apparatuses in at least a partial region of the display, in response to the state information of the plurality of external apparatuses from the plurality of external apparatuses through the communicator.

In accordance with another aspect of the present disclosure, a method of controlling a wireless charging system using an ultrasonic wave is provided. The method includes transmitting a charging request to a power transmission device using radio communication by an external apparatus, in response to the charging request being received from an external apparatus, determining a direction in which the external apparatus is positioned and a distance between the wireless power transmission device and the external apparatus, by a power transmission device, when a distance with the external apparatus is within a preset value, transmitting an ultrasonic signal to the external apparatus based on the direction and distance in which the external apparatus is positioned, by the power transmission device, and, in response to the ultrasonic signal being received, converting the ultrasonic signal into a charging voltage as an electric signal, by the external apparatus.

the determining of the distance between the wireless power transmission device and the external apparatus comprises using a difference between time periods in which the ultrasonic signal and a radio frequency signal reach the external apparatus.

The method may further include determining whether an object is present on a path for transmitting the ultrasonic signal, by the power transmission device, upon determining that an object is present on the path, stopping transmission of the ultrasonic signal, by the power transmission device, and, when transmission of the ultrasonic signal is stopped, displaying a UI indicating that transmission of the ultrasonic signal is stopped when transmission of the ultrasonic signal is stopped, by the power transmission device.

According to the diverse embodiments of the present disclosure, a wireless power transmission device may effectively enable wireless charging of an external apparatus and may provide charging information of an external apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
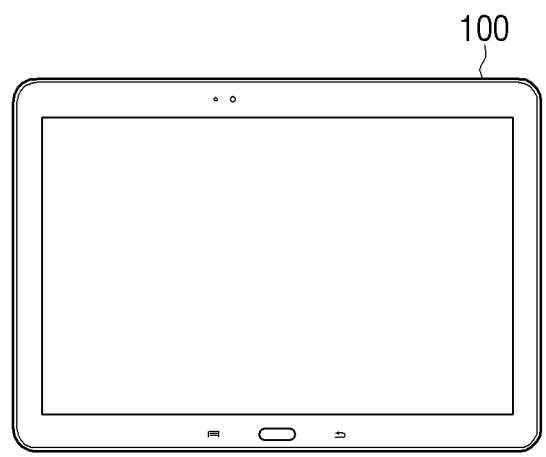
FIG. 1 is a diagram illustrating a wireless charging system according to an embodiment of the present disclosure.
Figure 1:
Figure 1:
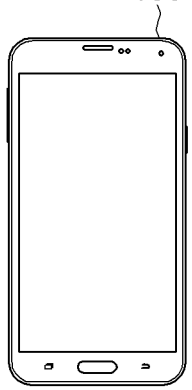

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Most of the terms used herein are general terms that have been widely used in the technical art to which the present disclosure pertains. However, some of the terms used herein may reflect intentions of technicians in this art, precedents, or new technologies. Also, some of the terms used herein may be arbitrarily chosen by the present applicant. In this case, these terms are defined below. Accordingly, the specific terms used herein should be understood based on the unique meanings thereof and the whole context of the present disclosure.

It will be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present disclosure. As used herein, the term "and/or" includes any and all combinations of one or more of the associated listed items.

As used herein, the singular forms "a," "an" and "the" are intended to include the plural forms as well, unless the context clearly indicates otherwise.

Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

The terms, such as 'unit,' 'module', etc., should be understood as a unit that processes at least one function or operation and that may be embodied in a hardware manner, a software manner, or a combination of the hardware manner and the software manner. In addition, a plurality of 'modules' or a plurality of 'units' may be integrated into at least one module to be embodied as at least one processor except for a 'module' or a 'unit' that needs to be embodied as a specific hardware.

In the specification, when it is described that a certain part is "connected" to another part, it should be understood that the certain part may be directly connected to another part or electrically connected to another part via another part in the middle.

In addition, in embodiments of the present disclosure, user input may include, but is not limited to, at least one of touch input, bending input, voice input, button input, and multimodal input.

All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

Hereinafter, the present disclosure will be described with reference to drawings. FIG. 1 is a diagram illustrating a wireless charging system 10 according to an embodiment of the present disclosure.

Referring to FIG. 1, the wireless charging system 10 may include a wireless power transmission device 100 and an external apparatus 150. In this case, the wireless power transmission device 100 may be embodied by being installed in various electronic devices such as smart televisions (TVs), notebook personal computers (PCs), and refrigerators and the external apparatus 150 may be embodied as various electronic devices such as smart phones, tablet PCs, notebook PCs, and digital cameras. The wireless power transmission device 100 and the external apparatus 150 may be a plurality of wireless power transmission devices 100 and/or a plurality of external apparatuses 150.

The external apparatus 150 may transmit a signal for requesting charging to a power transmission device using radio communication. In this case, the external apparatus 150 and the wireless power transmission device 100 may perform radio communication using Wi-Fi, Bluetooth, beacon, near field communication (NFC), and so on.

In response to a signal for requesting charging being received from the external apparatus 150, the wireless power transmission device 100 may determine a direction in which the external apparatus 150 is positioned and a distance between the wireless power transmission device 100 and the external apparatus 150. In more detail, the direction of the external apparatus 150 may be determined using a time difference in which ultrasonic waves generated from a plurality of transmitters of the wireless power transmission device 100 reach the external apparatus 150. In addition, the distance between the wireless power transmission device 100 and the external apparatus 150 using the characteristic in that a time period in which an ultrasonic signal transmitted from the wireless power transmission device 100 reaches the external apparatus 150 is proportional to a distance between the wireless power transmission device 100 and the external apparatus 150.

When a distance from the external apparatus 150 is within a preset value, the wireless power transmission device 100 may transmit an ultrasonic wave to the external apparatus 150 based on the direction and distance in which the external apparatus 150 is positioned.

In response to an ultrasonic signal being received from the wireless power transmission device 100, the external apparatus 150 may convert the ultrasonic signal into a charging voltage as an electric signal. In addition, the external apparatus 150 may receive state information from another external apparatus and display the received state information on at least a partial region of a display.

Figure 2:
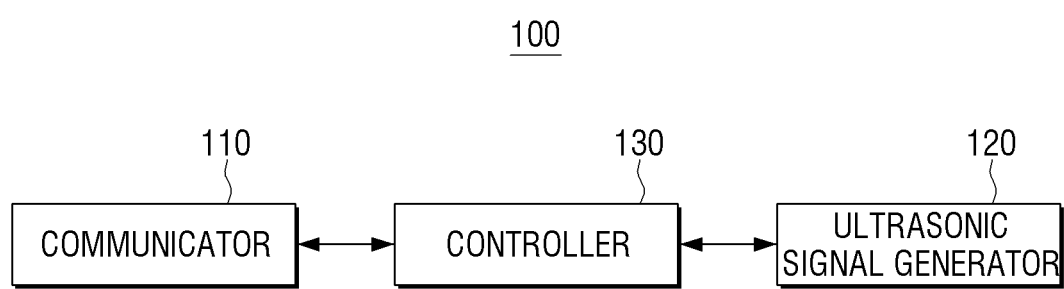
FIG. 2 is a block diagram illustrating components of a wireless power transmission device according to an embodiment of the present disclosure.

FIG. 2 is a block diagram illustrating components of a wireless power transmission device according to an embodiment of the present disclosure.

Referring to FIG. 2, the wireless power transmission device 100 may include a communicator 110, an ultrasonic signal generator 120, and a controller 130. According to an embodiment of the present disclosure, the wireless power transmission device 100 may include a power transmission device installed in an electronic device as well as a single apparatus for transmitting power.

The communicator 110 may communicate with the external apparatus 150. In particular, the communicator 110 may receive a signal for requesting charging from the external apparatus 150. In addition, the communicator 110 may transmit and receive arrival time (i.e., reaching time) of an ultrasonic signal to and from the external apparatus 150.

The ultrasonic signal generator 120 may generate an ultrasonic signal with an input voltage. For example, in response to an alternating current (AC) voltage being input to the ultrasonic signal generator 120, the ultrasonic signal generator 120 may convert the input AC voltage into an ultrasonic signal using a material with a piezoelectric effect. In more detail, the piezoelectric effect refers to an effect whereby mechanical energy such as vibration is converted into electric energy upon being input to a piezoelectric element and on the other hand, an inverse piezoelectric effect refers to an effect whereby electric energy is converted into vibration energy upon being input to a piezoelectric element. That is, in response to mechanical energy being input to the same piezoelectric element, electric energy may be generated, and in response to electric energy being input, mechanical energy may be generated. Accordingly, in response to power being input to the ultrasonic signal generator 120 including a plurality of converters formed of a piezoelectric element, the ultrasonic signal generator 120 may generate an ultrasonic signal, and in response to the ultrasonic signal being input to the ultrasonic signal generator 120, the ultrasonic signal generator 120 may generate an electric signal. In this case, the piezoelectric element may be a material such as lead zirconate titanate (PZT), barium titanate, $PbTiO_3$, $LiNbO_3$, $SiO_2$, and Rochelle salt.

The controller 130 may control an overall operation of the wireless power transmission device 100. In particular, in response to a charging request being received from the external apparatus 150 through the communicator 110, the controller 130 may determine a direction in which an external apparatus is positioned and a distance between the wireless power transmission device 100 and the external apparatus 150. In addition, when a distance with the external apparatus 150 is within a preset value, the controller 130 may control the ultrasonic signal generator 120 to transmit an ultrasonic signal to the external apparatus 150 based on the direction and distance in which the external apparatus 150 is positioned.

In more detail, the controller 130 may control the communicator 110 to receive a signal for requesting charging from the external apparatus 150.

In addition, the controller 130 may determine the direction in which the external apparatus 150 that has requested charging is positioned and the distance between the wireless power transmission device 100 and the external apparatus 150.

In more detail, the controller 130 may control the ultrasonic signal generator 120 to generate an ultrasonic wave by a plurality of transmitters. In addition, the controller 130 may control the communicator 110 to receive information about a time in which the plurality of generated ultrasonic waves reaches the external apparatus 150. In response to information about the arrival times of ultrasonic waves being received through the communicator 110, the controller 130 may determine a direction in which an external apparatus is positioned using a difference in arrival times of ultrasonic waves. A method of determining a direction in which the external apparatus 150 is positioned using a difference in arrival times will be described with reference to FIG. 5.

In addition, the controller 130 may determine a distance between the wireless power transmission device 100 and the external apparatus 150 using a time in which an ultrasonic signal generated by the wireless power transmission device 100 reaches the external apparatus 150. In more detail, the controller 130 may determine the distance between the wireless power transmission device 100 and the external apparatus 150 using a time in which the ultrasonic signal generated from the wireless power transmission device 100 reaches the external apparatus 150 and a time in which the ultrasonic signal generated from the external apparatus 150 reaches the wireless power transmission device 100. A method of determining a distance with the external apparatus 150 using arrival times will be described below with reference to FIG. 4.

In addition, when the distance with the external apparatus 150 is within a preset value, the controller 130 may control the ultrasonic signal generator 120 to transmit an ultrasonic signal to the external apparatus 150 based on the direction and distance in which the external apparatus 150 is positioned. In more detail, the controller 130 may control the ultrasonic signal generator 120 to activate a converter disposed in a direction corresponding to the position of the external apparatus 150 among a plurality of converters arranged in different direction so as to transmit an ultrasonic signal to the external apparatus 150. In this case, activation of the converter by the controller 130 may correspond to an operation of the converter for converting an electrical signal into an ultrasonic signal.

In addition, the controller 130 may determine whether an object is present on a path for transmitting an ultrasonic signal. In addition, when it is determined that an object is present on the path for transmitting an ultrasonic signal, the controller 130 may control the ultrasonic signal generator 120 to stop an ultrasonic signal from being transmitted. In more detail, when a backscattered signal is valid, the controller 130 may determine that an object is present on the path for transmitting the ultrasonic signal.

In addition, when transmission of the ultrasonic signal is stopped, the controller 130 may control a display (not shown) to display a user interface (UI) indicating that transmission of the ultrasonic signal is stopped.

Moreover, the controller 130 may control the communicator 110 to receive state information of a plurality of external apparatus from a plurality of external apparatuses. In addition, the controller 130 may control a display (not shown) to display state information of each of the plurality of external apparatuses on at least a partial region of the display.

Figure 3:
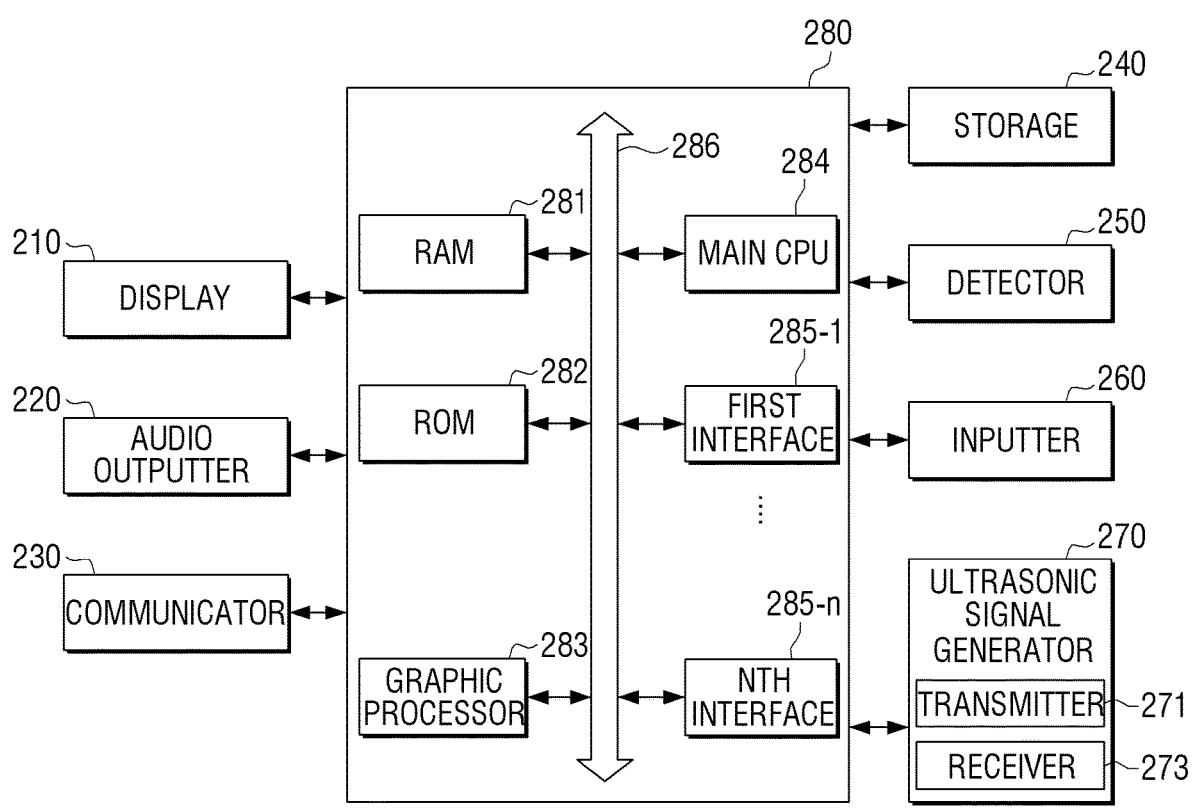
FIG. 3 is a block diagram illustrating components of a wireless power transmission device according to an embodiment of the present disclosure.

Hereinafter, various embodiments of the present disclosure will be described with reference to FIGS. 3 to 11. FIG. 3 is a block diagram illustrating components of the wireless power transmission device according to an embodiment of the present disclosure.

Referring to FIG. 3, a wireless power transmission device 200 may include a display 210, an audio outputter 220, a communicator 230, a storage 240, a detector 250, an inputter 260, an ultrasonic signal generator 270, and a controller 280.

FIG. 3 synthetically illustrates various components when the wireless power transmission device 100 may be, for example, an apparatus with various functions such as a display function, a user command input function, and a signal transceiving function. Accordingly, in some embodiments, some of the components illustrated in FIG. 3 may be omitted or modified and other components may be further added.

The display 210 may display at least one of a video frame obtained by processing image data received from an image receiver (not shown) by an image processor (not shown) and various images generated by a graphic processor 283. In particular, the display 210 may display state information of the external apparatus 150, received through the communicator 230. In addition, the display 210 may contain at least one of a recommendation image and a keyboard UI in a message window and display the message window.

The audio outputter 220 may be a component for various notification sounds or voice messages as well as various audio data items on which various processing operations such as decoding, amplification, or noise filtering are performed by an audio processor (not shown). In particular, the audio outputter 220 may be embodied any output terminal for outputting audio data.

The communicator 230 may be a component that communicates with various types of external apparatuses using various types of communication methods. The communicator 230 may include various communication chips such as a Wi-Fi chip, a Bluetooth chip, an NFC chip, and a radio communication chip. In this case, the Wi-Fi chip, the Bluetooth chip, and the NFC chip may perform communication using a WiFi method, a Bluetooth method, and an NFC method, respectively. Among these, the NFC chip may refer to a chip that operates via an NFC method using a band of 13.56 MHz among various RF-ID frequency bands such as 135 kHz, 13.56 MHz, 433 MHz, 860 to 960 MHz, and 2.45 GHz. When the Wi-Fi chip or the Bluetooth chip is used, various connection information items such as SSID and session key may be first transmitted and receive, communication may be connected using the connection information, and then various information items may be transmitted and received. The radio communication chip may refer to a chip that performs communication according to various communication standards such as IEEE, ZigBee, $3^{rd}$ generation (3G), $3^{rd}$ generation partnership project (3GPP), and long term evolution (LTE).

In particular, the communicator 230 may communicate with the external apparatus 150. In more detail, the communicator 230 may receive a charging request from the external apparatus 150. In addition, the communicator 230 may receive state information (e.g., a charging state and the remaining capacity of a battery) of the external apparatus 150 through a short-distance radio communication with the adjacent external apparatus 150.

The storage 240 may store various modules for driving the wireless power transmission device 200. For example, the storage 240 may store software including a base module, a sensing module, a communication module, a presentation module, a web browser module, and a service module. In this case, the base module may be a basic module that processes a signal transmitted from each hardware item included in the wireless power transmission device 200 and transmits the signal to a higher layer module. The sensing module may be a module that collects information from various sensors and analyzes and manages the collected information and includes a face recognition module, a voice recognition module, a motion recognition module, an NFC recognition module, and so on. The presentation module may be a module for constituting a display image, which includes a multimedia module for reproducing and outputting multimedia content, and a UI rendering module for performing UI and graphic processing. The communication module may be a module for communication with an external element. The web browser module refers to a module that performs web browsing to access a web server. The service module may be a module including various applications for providing various services.

As described above, the storage 240 may include various program modules but various program modules may be partially omitted or modified or other program modules may be added according to a type and characteristic of the wireless power transmission device 200, needless to say. For example, when the aforementioned wireless power transmission device 200 is embodied as a template PC, the base module may further include a position determining module for determining a GPS-based module and the sensing module may further include a sensing module for detecting an operation of a user.

According to an embodiment of the present disclosure, the storage 240 may be defined to include a read only memory (ROM) 282 and a random access memory (RAM) 281 in the controller 280 or a memory card (not shown) (e.g., a micro secure digital (SD) card and a memory stick) installed in the wireless power transmission device 200.

The detector 250 may detect a surrounding environment of the wireless power transmission device 200. In particular, the detector 250 may include various sensors such as a global positioning system (GPS) sensor for detecting position information, a movement detecting sensor (e.g., a gyro sensor, an acceleration sensor, etc.) for detecting movement of the wireless power transmission device 200, a pressure sensor, a noise sensor, and so on.

The inputter 260 may receive a user command for controlling the wireless power transmission device 200. In particular, the inputter 260 may include various input devices for receiving a user command, such as a touch inputter, a button, a voice inputter, a motion inputter, a keyboard, and a mouse.

The ultrasonic signal generator 270 may generate an ultrasonic signal. As illustrated in FIG. 3, the ultrasonic signal generator 270 may include a transmitter 271 and a receiver 273. According to an embodiment of the present disclosure, in response to an electric signal being input to the transmitter 271, the transmitter 271 may convert the input electric signal into an ultrasonic signal. In addition, in response to the ultrasonic signal being transmitted to the receiver 273 from the external apparatus 150, the receiver 273 may convert the ultrasonic signal into the electric signal.

The controller 280 may control an overall operation of the wireless power transmission device 200 using various programs stored in the storage 240.

As illustrated in FIG. 3, the controller 280 may include the RAM 281, the ROM 282, the graphic processor 283, a main central processing unit (CPU) 284, first to $n^{th}$ interfaces 285-1 to 285-n, and a bus 286. In this case, the RAM 281, the ROM 282, the graphic processor 283, the main CPU 284, the first to $n^{th}$ interfaces 285-1 to 285-n, and so on may be connected to each other through the bus 286.

The ROM 282 may store a command set for system booting. When a turn on command is input to supply power, the main CPU 284 may copy an operating system (O/S) stored in the storage 240 to the RAM 281 and execute the O/S to boot a system according to the command stored in the ROM 282. In response to the booting being completed, the main CPU 284 may copy various application programs stored in the storage 240 to the RAM 281 and execute the application copied to the RAM 281 to perform various operations.

The graphic processor 283 may generate an image including various objects such as a pointer, an icon, an image, and a text using a calculator (not shown) and a renderer. The calculator may calculate an attribute value such as a coordinate value, a shape, a size, and color, with which each object is to be displayed, according to a layout of an image according to a control command received from the inputter. The renderer may generate various layouts including an object based on the attribute value calculated by the calculator. An image generated by the renderer may be display in a display region of the display 210.

The main CPU 284 may access the storage 240 and perform booting the O/S stored in the storage 240. In addition, the main CPU 284 may perform various operations using various programs, content, data, and so on, which are stored in the storage 240.

The first to $n^{th}$ interfaces 285-1 to 285-n may be connected to the aforementioned various components. One of the interfaces may be a network interface connected to an external apparatus through a network.

In particular, the controller 280 may receive a charging request from the external apparatus 150 through the communicator 230 and determine a direction of the external apparatus 150 that transmits the charging request and a distance between the wireless power transmission device 200 and the external apparatus 150. In addition, when the distance with the external apparatus 150 is within a preset value, the controller 280 may control the ultrasonic signal generator 270 to transmit an ultrasonic signal to the external apparatus 150 based on the direction and distance in which the external apparatus 150 is positioned.

In more detail, the controller 280 may control the communicator 230 to receive a charging request from the external apparatus 150. In this case, the charging request received from the external apparatus 150 may be received directly from the external apparatus 150 but this is merely an embodiment, and thus the charging request may be received through a relay apparatus such as a server and a base station.

In addition, the controller 280 may determine the distance between the wireless power transmission device 200 and the external apparatus 150. In more detail, the controller 280 may determine the distance between the wireless power transmission device 200 and the external apparatus 150 using a time in which an ultrasonic signal generated from the wireless power transmission device 200 reaches the external apparatus 150 and a time in which an ultrasonic signal generated from the external apparatus 150 reaches the wireless power transmission device 200.

FIGS. 4, 5, 6A, 6B, 7, 8A, 8B, 9, 10 and 11 are diagrams for explanation of various embodiments for transmitting an ultrasonic signal to a position of an external apparatus and providing a user interface (UI) indicating state information of an external apparatus, according to various embodiments of the present disclosure.

Figure 4:
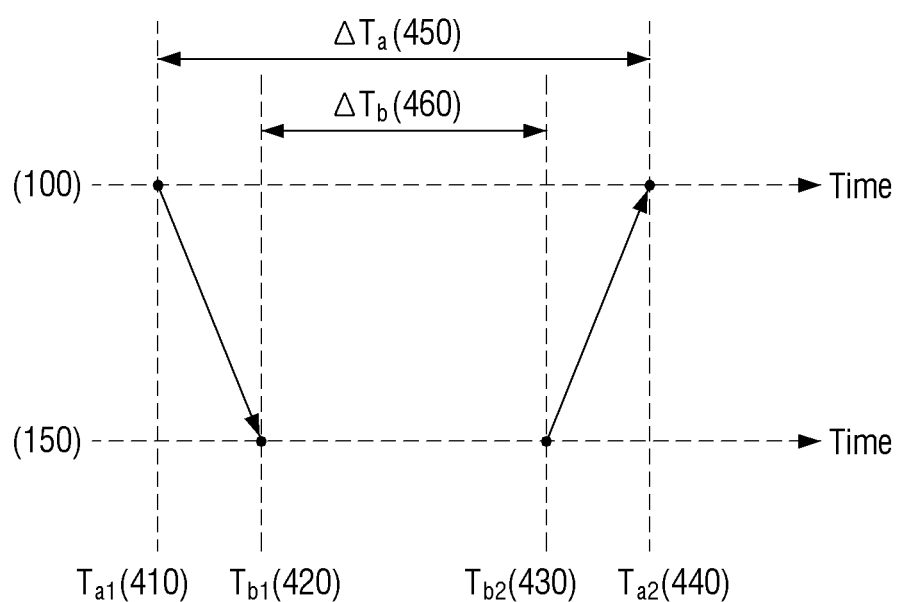
FIGS. 4, 5, 6A, 6B, 7, 8A, 8B, 9, 10 and 11 are diagrams for explanation of various embodiments for transmitting an ultrasonic signal to a position of an external apparatus and providing a user interface (UI) indicating state information of an external apparatus according to various embodiments of the present disclosure.

Referring to FIG. 4, $T_{a1}$ 410 may refer to a time in which an ultrasonic wave is generated from the wireless power transmission device 200, $T_{b1}$ 420 may refer to a time in which the ultrasonic wave generated by the wireless power transmission device 200 reaches the external apparatus 150, $T_{b2}$ 430 may refer to a time in which an ultrasonic wave is generated from the external apparatus 150, and $T_{a2}$ 440 may refer to a time in which the ultrasonic wave generated from the external apparatus 150 reaches the wireless power transmission device 200. In addition, $\Delta T_a$ 450 may be $T_{a2}$ 440-$T_{a1}$ 410 and may refer to a difference between the time in which the ultrasonic wave generated from the external apparatus 150 reaches the wireless power transmission device 200 and the time in which the ultrasonic wave is generated from the wireless power transmission device 200. In addition, $\Delta T_b$ 460 may be $T_{b2}$ 430-$T_{b1}$ 420 and may refer to a difference between the time in which the ultrasonic wave is generated from the external apparatus 150 and the time in which ultrasonic wave generated from the wireless power transmission device 200 reaches the external apparatus 150.

In response to information about $T_{b1}$ 420 and $T_{b2}$ 430 being received through the communicator 230, the controller 280 may calculate a value of $\Delta T_a$ 450-$\Delta T_b$ 460. In this case the value of $\Delta T_a$ 450-$\Delta T_b$ 460 may refer to the sum of the time in which the ultrasonic wave generated from the wireless power transmission device 200 reaches the external apparatus 150 and the time in which the ultrasonic wave generated from the external apparatus 150 reaches the wireless power transmission device 200, and thus a value of $[\Delta T_a$ 450-$\Delta T_b$ 460$]/2$ may refer to a time in which the ultrasonic wave generated from the wireless power transmission device 200 reaches the external apparatus 150. According to Formula "distance=time*velocity", the controller 280 may determine a distance between the wireless power transmission device 200 and the external apparatus 150. That is, a distance x between the wireless power transmission device 200 and the external apparatus 150 may be represented according to Equation 1.

$$X = \frac{\Delta T_a - \Delta T_b}{2} \times (334 + 0.4T)_p (T = \text{Temperature}) \qquad \text{Equation 1}$$

According to another embodiment of the present disclosure, the controller 280 may determine the distance with the external apparatus 150 using a difference between time periods in which an ultrasonic signal and an RF signal reach the external apparatus 150. In more detail, velocity of an RF signal in the air may be about $3*10^8$ (m/s) and is about $10^6$ times higher than velocity of an ultrasonic wave, and thus a time difference may occur due to velocity. That is, the controller 280 may determine the distance with the external apparatus 150 using a time difference between a time in which the RF signal reaches the external apparatus 150 and a time in which the ultrasonic signal reaches the external apparatus 150 using the above time difference.

In addition, the controller 280 may determine a direction in which the external apparatus 150 transmits the charging request. In more detail, the controller 280 may control the ultrasonic signal generator 270 to generate an ultrasonic wave in each of a plurality of transmitters 271. In addition, the controller 280 may receive information about a time in which each of a plurality of ultrasonic waves generated from the external apparatus 150 reaches the external apparatus 150, through the communicator 230. In addition, the controller 280 may determine the direction in which the external apparatus 150 is positioned using a difference between time periods in which each of a plurality of ultrasonic waves reaches the external apparatus 150.

Figure 5:
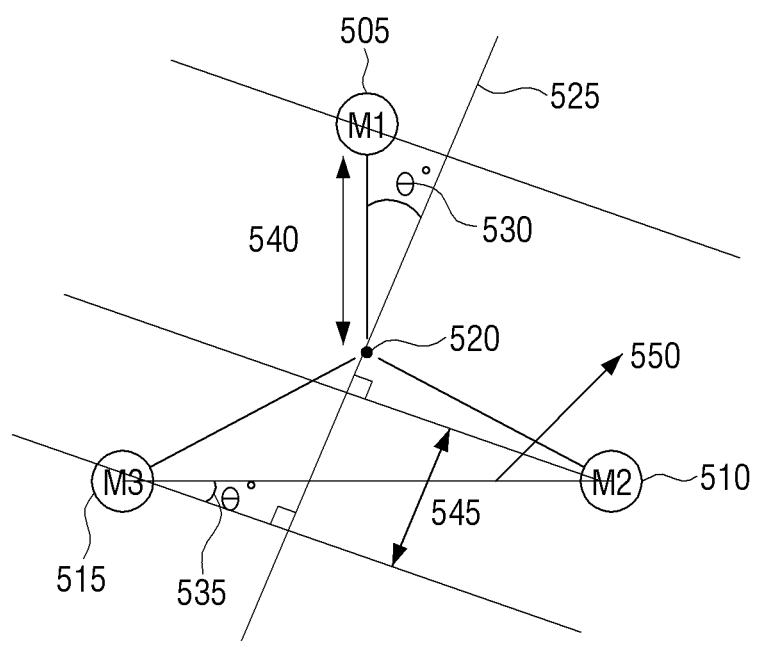

An embodiment of the present disclosure will be described with reference to FIG. 5. Three transmitters M1 505, M2 510, and M3 515 may be positioned in different regions, respectively. Lines formed by respectively connecting the three transmitters the M1 505, the M2 510, and the M3 515 to a center 520 of the M1 505, the M2 510, and the M3 515 and a line 525 formed by connecting the center 520 to the external apparatus 150 may be assumed. In addition, lines formed by perpendicularly connecting the M1 505, the M2 510, and the M3 515, respectively may be assumed. A distance between the M2 510 and the M3 515 based on the perpendicular line may be assumed to be d 545. In addition, assuming that time periods in which ultrasonic waves generated from the M2 510 and the M3 515 reach an external apparatus are t2 and t3, respectively, the external d 545 may be obtained using a difference between t2 and t3. That is, the distance d 545 as the distance between the M2 510 and the M3 515 may be represented by Equation 2 below.

$$d=|t2-t3|\times(334+0.4T), T=\text{Temperature} \quad \text{Equation 2}$$

In addition, when an angle formed by the M1 505, the center 520, and the external apparatus 150 is θ 530, the d 545 may be represented using y 550 between the M2 510 and the M3 515.

$$d=y\times\sin\theta \quad \text{Equation 3}$$

Equation 3 above may be re-written according to Equation 4 below.

$$\theta = \sin^{-1}\left(\frac{d}{y}\right) \quad \text{Equation 4}$$

That is, θ 530, as the angle formed by the M1 505 and the center 520, the external apparatus 150 may be obtained using the aforementioned method. Accordingly, the controller 280 may determine the direction in which the external apparatus 150 is positioned using a difference in arrival times of ultrasonic signals generated from the plurality of transmitters 271. Although the case in which the direction of the external apparatus 150 is determined using a difference in arrival times of ultrasonic waves has been described with regard to the present embodiment, the direction in which the external apparatus 150 is positioned may be determined via various methods such as a method of receiving a position of the external apparatus 150 and determining a relation position with the wireless power transmission device 200 or a method using Bluetooth.

In addition, when a distance between the wireless power transmission device 200 and the external apparatus 150 is within a preset value, the controller 280 may control the ultrasonic signal generator 270 to transmit an ultrasonic signal to the external apparatus 150 based on the direction and distance in which the external apparatus 150 is positioned.

Figure 6A:
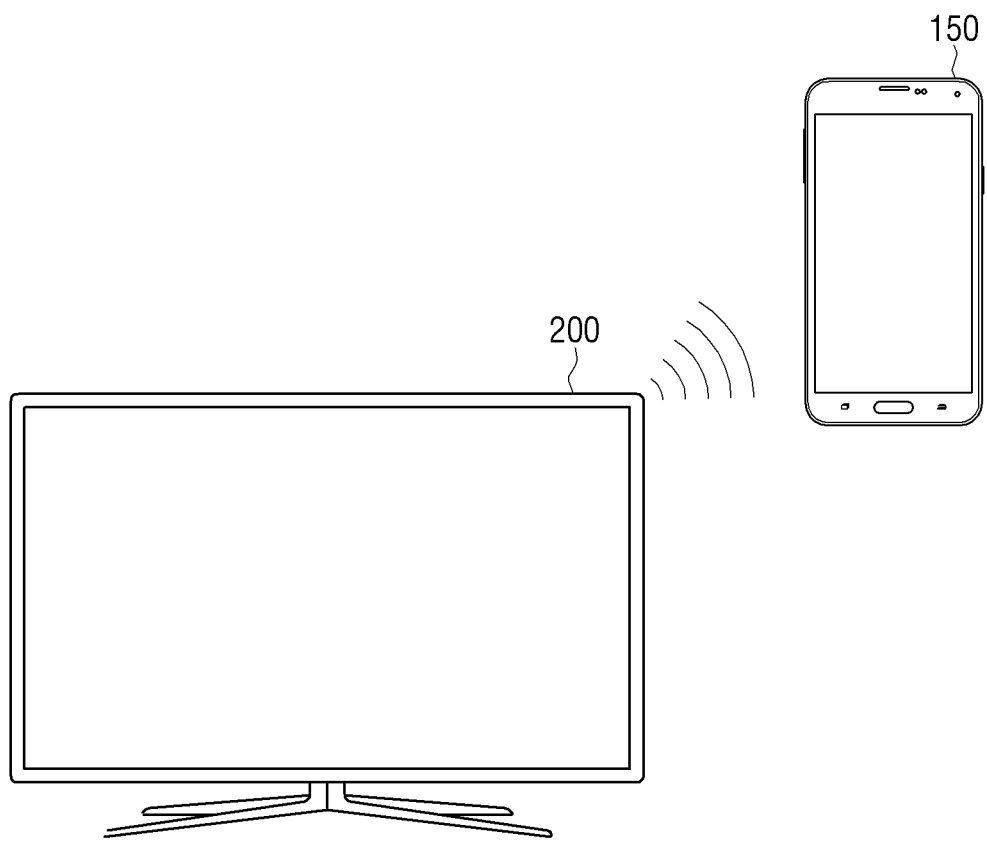

Referring to FIG. 6A, when the distance between the wireless power transmission device 200 and the external apparatus 150 is within a preset value and the external apparatus 150 is positioned in a one o'clock direction, the controller 280 may control the ultrasonic signal generator 270 to transmit an ultrasonic signal in a one o'clock direction.

Figure 6B:
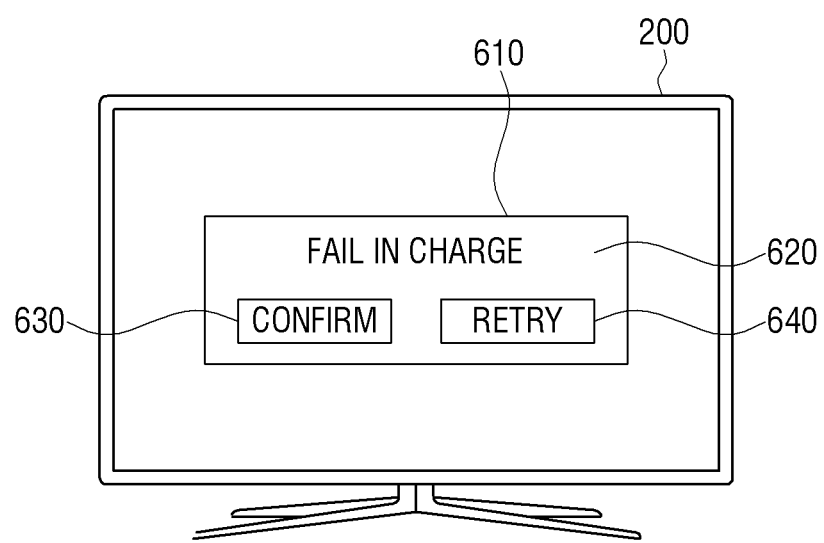

Referring to FIG. 6B, when a specific event occurs during transmission of an ultrasonic signal and transmission of an ultrasonic signal is stopped, the controller 280 may control the display 210 to display a UI indicating that transmission of the ultrasonic signal is stopped. For example, as illustrated in FIG. 6B, the controller 280 may control the display 210 to display guidance words of "fail in charge 620" and a UI 610 including "confirm 630" and "retry 640". In addition, in response to a user command for selection of "retry 640" being input through the inputter 260, the controller 280 may control the ultrasonic signal generator 270 to transmit an ultrasonic signal.

Figure 7:
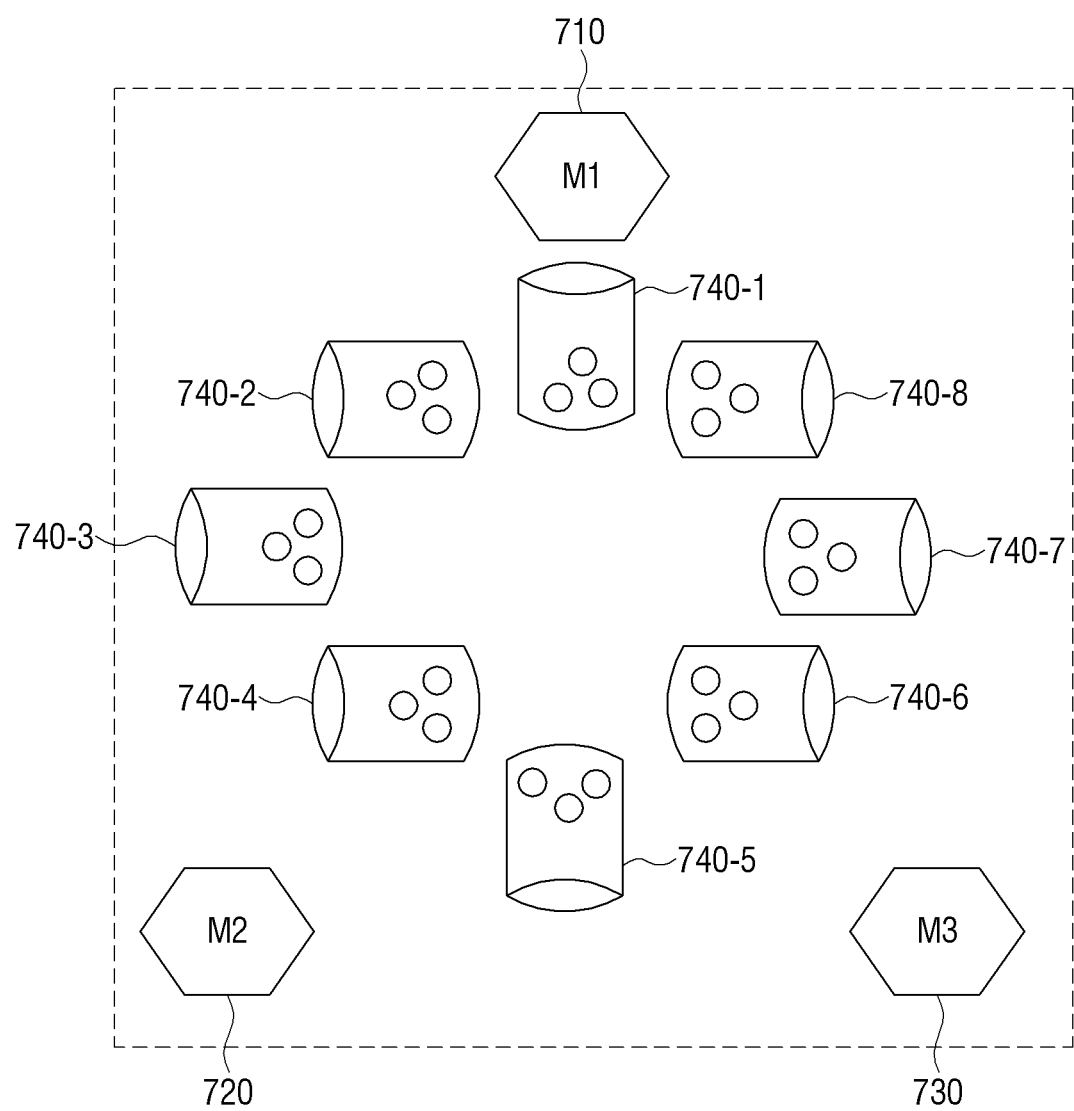

According to an embodiment of the present disclosure, a method of controlling the ultrasonic signal generator 270 to transmit an ultrasonic signal in a specific direction by the controller 280 will be described with reference to FIG. 7. When the external apparatus 150 is positioned within a preset distance, the controller 280 may control the ultrasonic signal generator 270 to transmit an ultrasonic signal in the determined direction of the external apparatus 150. In more detail, as illustrated in FIG. 7, the transmitter 271 included in the ultrasonic signal generator 270 may include a plurality of transducers 740-1 to 740-8 that are arranged in different directions. The ultrasonic signal generator 270 may activate a transducer corresponding to a direction in which the external apparatus 150 among the plurality of transducers arranged in different directions to transmit an ultrasonic signal in the direction of the external apparatus 150 according to control of the controller 280. In addition, the controller 280 may control a degree of an ultrasonic signal based on the number of activated transducers and a used frequency.

In addition, when it is determined that an object is present on a path for transmitting an ultrasonic signal during transmission of the ultrasonic signal, the controller 280 may control the ultrasonic signal generator 270 to stop transmission of the ultrasonic signal.

Figure 8A:
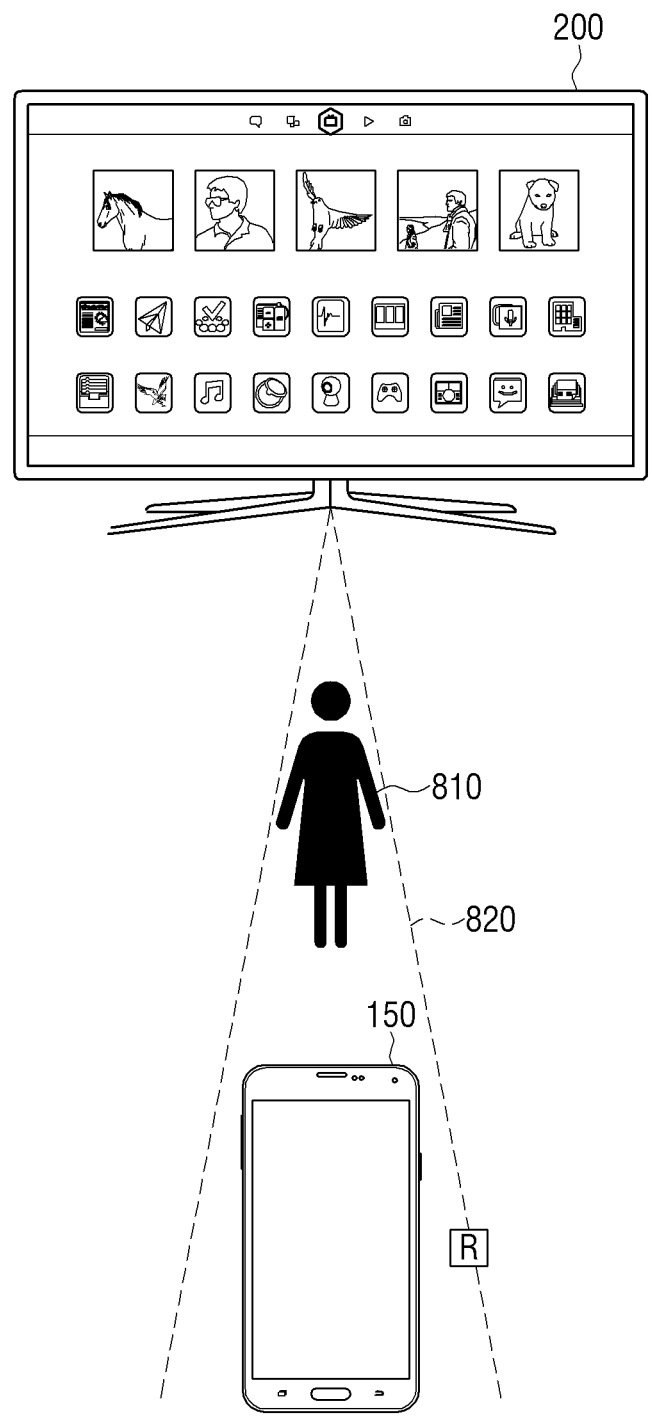

Referring to FIG. 8A, when it is determined that a human 810 is present on a path 820 for transmitting an ultrasonic signal, the controller 280 may control the ultrasonic signal generator 270 to stop transmission of the ultrasonic signal. In more detail, when the ultrasonic signal generated by the ultrasonic signal generator 270 faces an object during transmission of the ultrasonic signal, the ultrasonic signal may be converted into a Doppler frequency from a transmitted frequency. When an ultrasonic signal with a different frequency from the transmitted frequency reaches the external apparatus 150, the controller 280 may receive information indicating that a frequency of the ultrasonic signal transmitted through the communicator 230 is different. In addition, the controller 280 may control the ultrasonic signal generator 270 to stop transmission of the ultrasonic signal.

In addition, the controller 280 may control the display 210 to display a UI indicating that transmission of the ultrasonic signal is stopped.

Figure 8B:
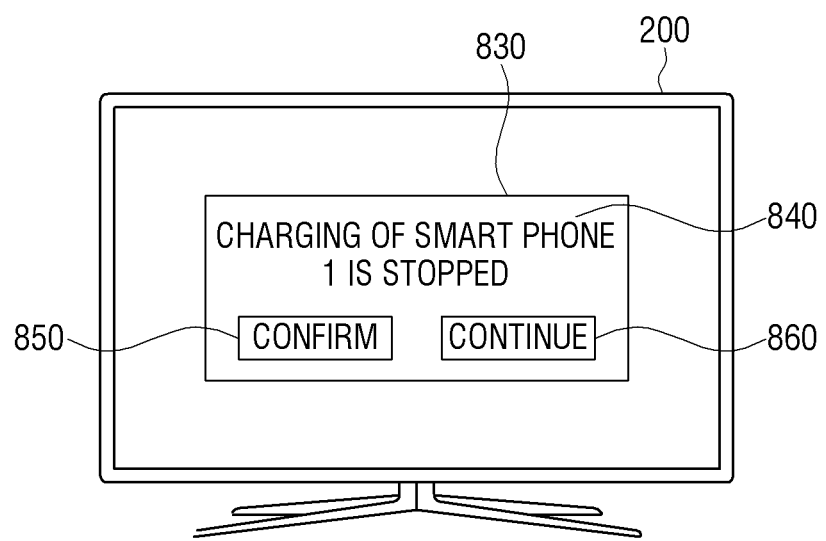

Referring to FIG. 8B, the controller 280 may control the display 210 to display guidance words such as "charging of smart phone 1 is stopped. 840" and a guide UI 830 including "confirm 850" and "continue 860".

According to an embodiment of the present disclosure, the controller 280 may receive state information of an external apparatus from a plurality of external apparatuses through the communicator 230. In addition, the controller 280 may control the display 210 to display the received state information of a plurality of external apparatuses in at least a partial region of a display. In this case, the state information may include information about whether an external apparatus is being charged, the remaining capacity of a battery, and so on.

Figure 9:
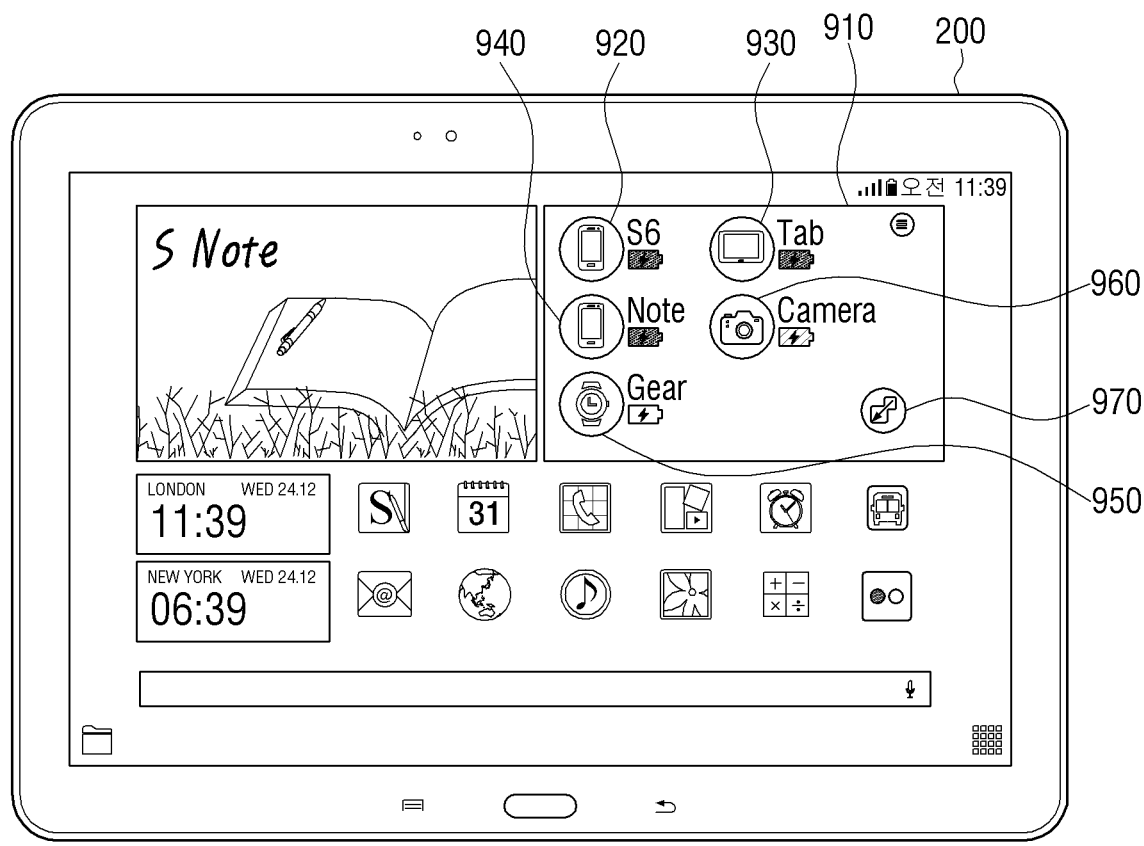

Referring to FIG. 9, the controller 280 may receive state information of a smart phone 1 920, a tablet PC 930, a smart phone 2 940, a smart watch 950, and a camera 960 through the communicator 230. In addition, the controller 280 may control the display 210 to display respective icons indicting the smart phone 1 920, the tablet PC 930, the smart phone 2 940, the smart watch 950, and the camera 960, and an icon 970 indicating whether wireless charging is being performed on a partial region 910 of the display.

Figure 10:
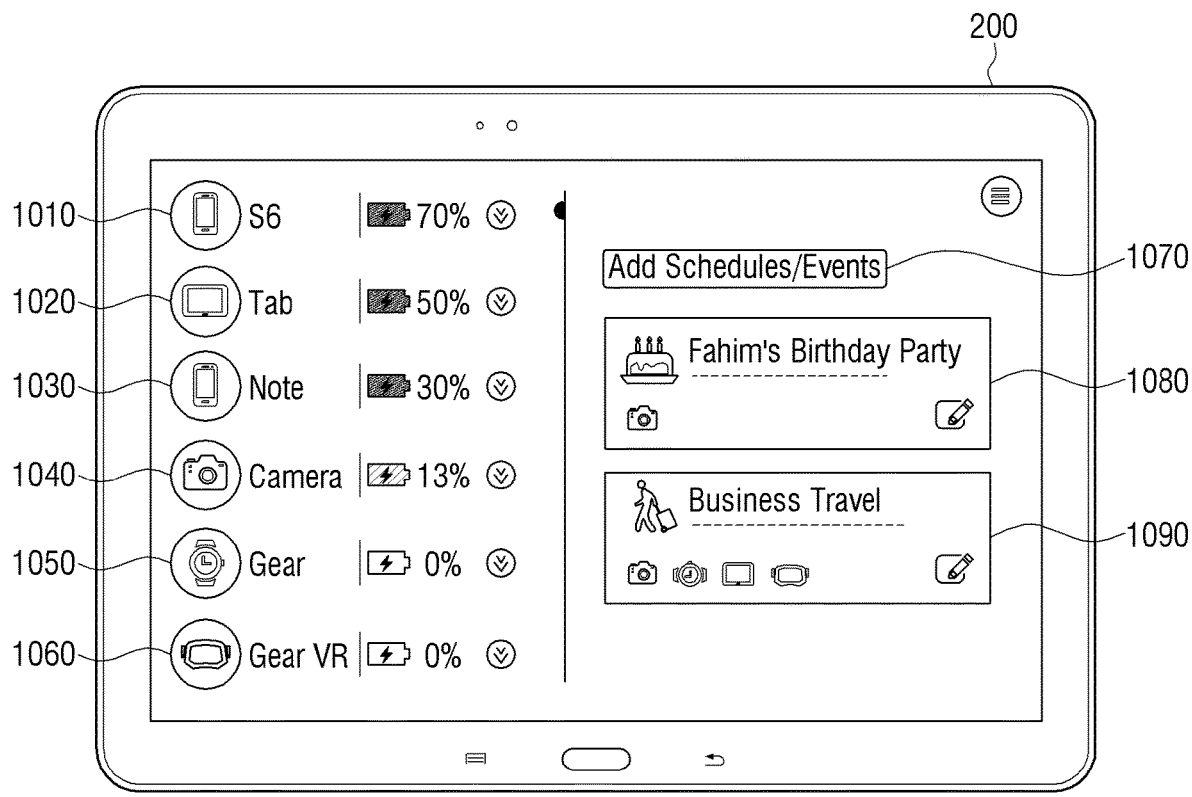

Referring to FIG. 10, the controller 280 may control the display 210 to display respective icons corresponding to a smart phone 1 1010, a tablet PC 1020, a smart phone 2 1030, a camera 1040, a smart watch 1050, and a VR 1060 on at least a partial region of an application execution image during execution of a schedule management application. In addition, in response to a user command for selection of the smart phone 1 1010 being input through the inputter 260, the controller 280 may control the display 210 to display state information of the smart phone 1 1010 to display state information in at least a portion of an application execution image. In this case, the state information may include information about whether the smart phone 1 is being charged, the remaining capacity of a battery, available time of the smart phone 1 with the remaining capacity of a battery, and so on. The controller 280 may further control the display 210 to display various functions and user information such as a scheduling function 1070 and planned events including, as examples, a birthday party notice 1080 and a travel event notice 1090.

According to an embodiment of the present disclosure, the controller 280 may control the communicator 230 to transmit state information of a plurality of external apparatuses to any of a plurality of external apparatuses.

Figure 11:
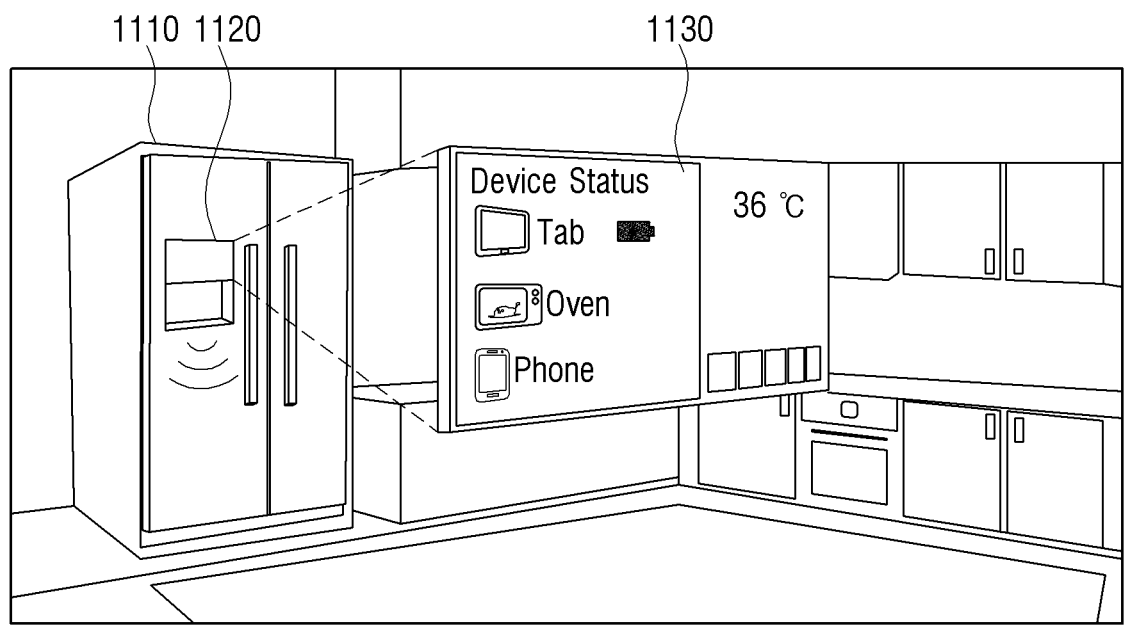

Referring to FIG. 11, the controller 280 may control the communicator 230 to transmit state information 1130 of a tablet PC, an oven, a smart phone, and so on to a refrigerator 1110. Upon receiving the state information 1130, the refrigerator 1110 may display the state information 1130 on a display 1120.

Hereinafter, a method of controlling the wireless power transmission device 100 according to an embodiment of the present disclosure will be described below with reference to FIG. 12.

Figure 12:
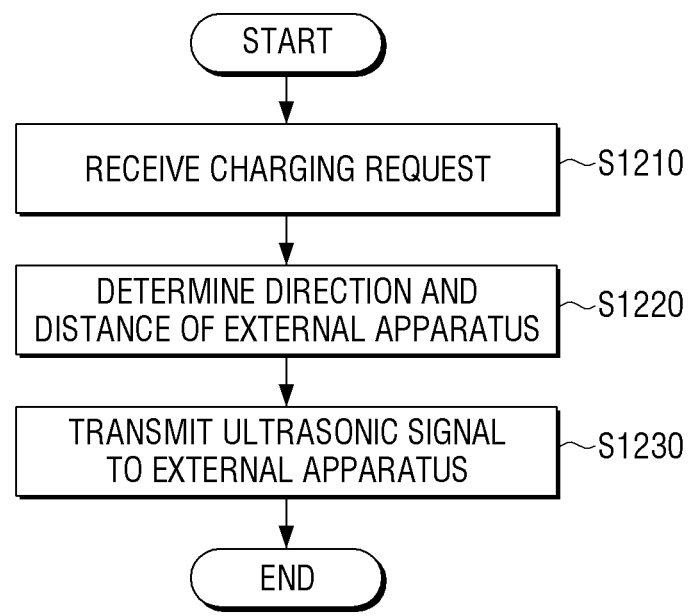
FIG. 12 is a flowchart for explanation of a method for controlling a wireless power transmission apparatus according to an embodiment of the present disclosure.

FIG. 12 is a flowchart for explanation of a method for controlling a wireless power transmission apparatus according to an embodiment of the present disclosure.

Referring to FIG. 12, the wireless power transmission device 100 may receive a charging request from an external apparatus using radio communication at operation S1210.

In addition, the wireless power transmission device 100 may determine a direction in which an external apparatus is positioned and a distance between the wireless power transmission device 100 and an external apparatus at operation S1220. In more detail, the wireless power transmission device 100 may generate an ultrasonic wave at a plurality of transmitters and determine a direction in which an external apparatus is positioned using a difference in time periods in which a plurality of generated ultrasonic waves reach an external apparatus. In addition, the wireless power transmission device 100 may determine the distance between the wireless power transmission device 100 and an external apparatus in which an ultrasonic signal generated from the wireless power transmission device 100 reaches an external apparatus and a time in which an ultrasonic signal generated from an external apparatus the wireless power transmission device 100.

In addition, when a distance with an external apparatus is within a preset value, the wireless power transmission device 100 may transmit an ultrasonic signal to an external apparatus based on the direction and distance in which an external apparatus is positioned at operation S1230.

Hereinafter, a method of determining a distance with an external apparatus by the wireless power transmission device 100 according to an embodiment of the present disclosure will be described with reference to FIG. 13.

Figure 13:
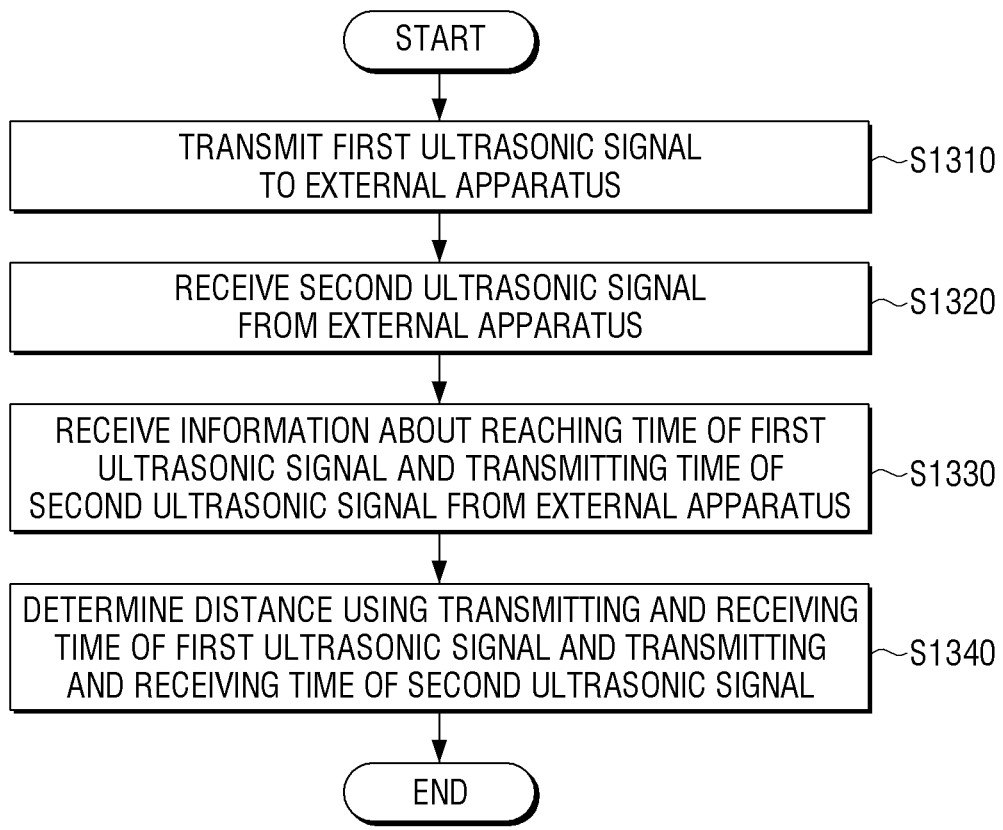
FIG. 13 is a flowchart for explanation of a distance between a wireless power transmission device and an external apparatus according to an embodiment of the present disclosure.

FIG. 13 is a flowchart for explanation of a distance between a wireless power transmission device and an external apparatus according to an embodiment of the present disclosure.

Referring to FIG. 13, the wireless power transmission device 100 may transmit a first ultrasonic signal to an external apparatus at operation S1310.

The wireless power transmission device 100 may receive a second ultrasonic signal from an external apparatus at operation S1320.

The wireless power transmission device 100 may receive information about a time in which the first ultrasonic signal from an external apparatus reaches an external apparatus and a time in which the second ultrasonic signal is transmitted at operation S1330.

In addition, the wireless power transmission device 100 may determine a distance with the external using transmitting/receiving time of the first ultrasonic signal and transmitting/receiving time of the second ultrasonic signal at operation S1340. In more detail, the wireless power transmission device 100 may determine a time in which the ultrasonic wave is moved between the wireless power transmission device 100 and an external apparatus using a difference between arrival time of the second ultrasonic signal and transmission starting time of the first ultrasonic signal and a difference between transmission starting time of the second ultrasonic signal and arrival time of the first ultrasonic signal. According to "distance=time*velocity", the wireless power transmission device 100 may determine the distance with an external apparatus.

Hereinafter, a method of determining a position in which an external apparatus is positioned by the wireless power transmission device 100 according to an embodiment of the present disclosure will be described with reference to FIG. 14.

Figure 14:
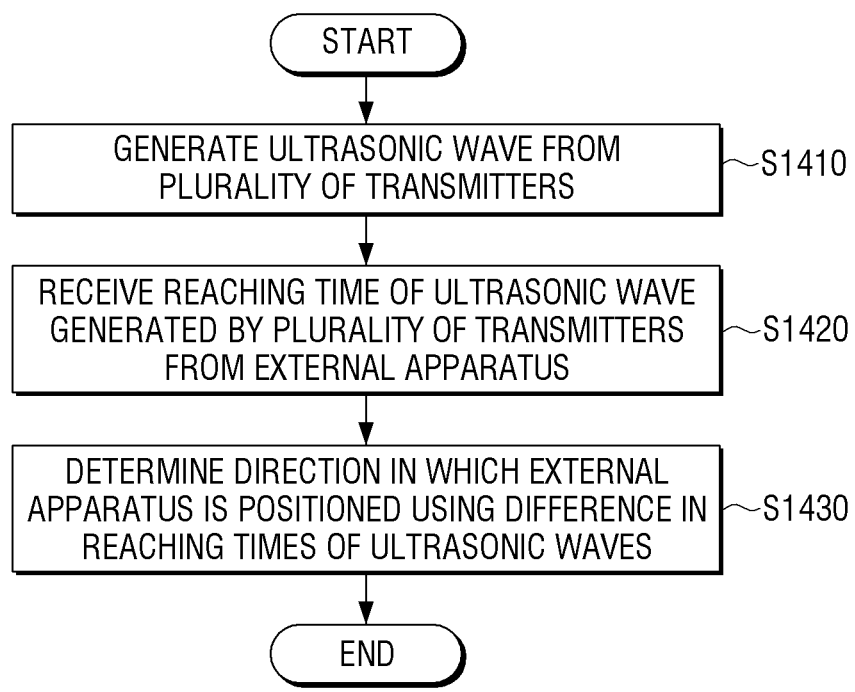
FIG. 14 is a flowchart for explanation of a method of determining a distance in which an external apparatus is positioned by a wireless power transmission device according to an embodiment of the present disclosure.

FIG. 14 is a flowchart for explanation of a method of determining a distance in which an external apparatus is positioned by a wireless power transmission device according to an embodiment of the present disclosure.

Referring to FIG. 14, the wireless power transmission device 100 may generate a plurality of ultrasonic signals through a plurality of transmitters at operation S1410.

The wireless power transmission device 100 may receive arrival times of respective ultrasonic signals generated by a plurality of transmitters, from an external apparatus at operation S1420.

The wireless power transmission device 100 may determine a direction in which the external apparatus 150 is positioned using a difference between arrival time periods at operation S1430. For example, the wireless power transmission device 100 may assume lines formed by perpendicularly connecting lines between an external apparatus and a central point of first, second, and third transmitters from a plurality of transmitters. In addition, the wireless power transmission device 100 may determine a distance between a line between the second transmitter and the third transmitter and the central point of the first, second, and third transmitters. In addition, the wireless power transmission device 100 may determine an angle between the first transmitter and an external apparatus using a distance a line between the second transmitter and the third transmitter and the central point of the first, second, and third transmitters.

Hereinafter, a method of controlling the wireless charging system 10 according to an embodiment of the present disclosure will be described with reference to FIG. 15.

Figure 15:
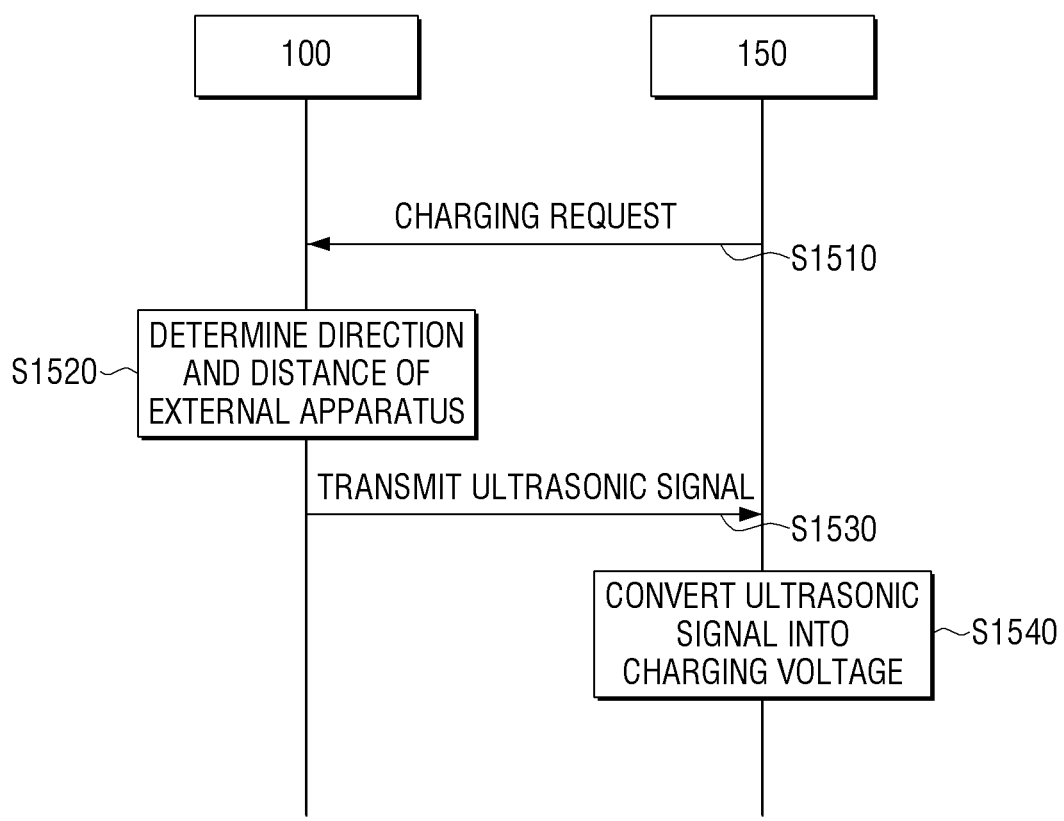
FIG. 15 is a sequence diagram for explanation of a method of controlling a wireless charging system according to an embodiment of the present disclosure.

FIG. 15 is a sequence diagram for explanation of a method of controlling a wireless charging system according to an embodiment of the present disclosure.

Referring to FIG. 15, the external apparatus 150 may transmit a charging request to the wireless power transmission device 100 at operation S1510. The external apparatus 150 and the wireless power transmission device 100 may transmit and receive the charging request using radio communication.

In response to the charging request being received from an external apparatus, the wireless power transmission device 100 may determine a direction and distance of the external apparatus 150 at operation S1520. In more detail, the wireless power transmission device 100 may determine the distance with the external apparatus 150 using the characteristic in that a time period in which an ultrasonic wave is moved is proportional to a distance between the wireless power transmission device 100 and the external apparatus 150. In addition, the wireless power transmission device 100 may determine the direction in which the external apparatus 150 is positioned using a difference in arrival times of ultrasonic signals generated using a plurality of transmitters.

In addition, the wireless power transmission device 100 may transmit an ultrasonic signal to the external apparatus 150 at operation S1530. In more detail, when it is determined that a distance with the external apparatus 150 is within a preset distance, the wireless power transmission device 100 may transmit an ultrasonic signal to the external apparatus 150 based on the direction and distance in which the external apparatus 150 is positioned.

In addition, the external apparatus 150 may convert an ultrasonic signal into a charging voltage at operation S1540. In more detail, in response to the ultrasonic signal being received from the wireless power transmission device 100, the external apparatus 150 may convert the ultrasonic signal into a charging voltage and charge an external apparatus.

The aforementioned method can be written as computer programs and can be implemented in general-use digital computers that execute the programs using a computer readable recording medium. In addition, a configuration of data used through a plurality of means can be recorded in a recording medium. Examples of the computer readable recording medium include magnetic storage media (e.g., ROM, floppy discs, hard discs, etc.), and storage media such as optical recording media (e.g., compact discs read only memory (CD-ROMs), or digital versatile discs (DVDs)).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting an ultrasonic signal, the method comprising:

identifying, by at least one processor of a wireless power transmission device, a direction in which an external apparatus is positioned;

identifying, by the at least one processor, a distance between the wireless power transmission device and the external apparatus;

transmitting the ultrasonic signal to the external apparatus based on the direction in which the external apparatus is positioned and the distance between the wireless power transmission device and the external apparatus;

obtaining, by the at least one processor, state information of the external apparatus using radio communication while the ultrasonic signal is transmitted to the external apparatus; and displaying the state information of the external apparatus, wherein the wireless power transmission device comprises a plurality of transducers arranged in different directions, wherein the transmitting further comprises:

selecting, by the at least one processor, at least one transducer, among the plurality of transducers, corresponding to the identified direction in which the external apparatus is positioned; and transmitting the ultrasonic signal using the selected at least one transducer in the identified direction in which the external apparatus is positioned, wherein a first transducer from among the plurality of transducers is arranged to transmit an ultrasonic signal in a first direction, and a second transducer from among the plurality of transducers is arranged to transmit an ultrasonic signal in a second direction that is different from the first direction, wherein a magnitude of ultrasonic signal transmitted by the at least one transducer is changed based on a number of active transducers of the plurality of transducers, and wherein the state information of the external apparatus includes a charging state of the external apparatus or the remaining capacity of a battery of the external apparatus.

2. The method as claimed in claim 1, further comprising:

determining whether an object is present on a path for transmitting the ultrasonic signal; and upon determining that the object is present on the path, stopping transmission of the ultrasonic signal.

3. The method as claimed in claim 2, further comprising, when transmission of the ultrasonic signal is stopped, displaying a user interface (UI) indicating that transmission of the ultrasonic signal is stopped.

4. The method as claimed in claim 2, wherein the determining of whether the object is present comprises determining that the object is present on the path when a backscattered signal is valid.

5. The method as claimed in claim 1, wherein the transmitting comprises transmitting an ultrasonic signal to the external apparatus when the distance between the wireless power transmission device and the external apparatus is within a preset value.

6. The method as claimed in claim 1, wherein the identifying comprises identifying the distance between the wireless power transmission device and the external apparatus using a time in which an ultrasonic signal generated from the wireless power transmission device reaches the external apparatus and a time in which an ultrasonic signal generated from the external apparatus reaches the wireless power transmission device.

7. The method as claimed in claim 1, wherein the identifying of the direction comprises generating an ultrasonic wave at a plurality of transmitters and identifying the direction in which the external apparatus is positioned using a difference in time periods in which the plurality of generated ultrasonic waves reaches the external apparatus.

8. The method as claimed in claim 1, wherein the selected transducer is arranged in a direction corresponding to a position of the external apparatus among the plurality of transducers arranged in different directions.

9. The method as claimed in claim 1, wherein the transmitting of the ultrasonic signal comprises converting an electric signal into an ultrasonic signal.

10. The method as claimed in claim 1, further comprising:
receiving the state information of a plurality of external apparatus from the plurality of external apparatus; and
displaying the state information of each of the plurality of external apparatus in at least a partial region of a display.

11. A wireless power transmission device transmitting an ultrasonic signal, the device comprising:
a communicator configured to wirelessly communicate with an external apparatus;
a display;
an ultrasonic signal generator configured to generate the ultrasonic signal;
a plurality of transducers arranged in different directions; and
at least one processor configured to control the ultrasonic signal generator to:
identify a direction in which the external apparatus is positioned,
identify a distance between the wireless power transmission device and the external apparatus,
select at least one transducer, among the plurality of transducers, corresponding to the identified direction in which the external apparatus is positioned,
transmit an ultrasonic signal to the external apparatus, using the selected at least one transducer, based on the direction in which the external apparatus is positioned and the distance between the wireless power transmission device and the external apparatus,
obtain state information of the external apparatus using radio communication while the ultrasonic signal is transmitted to the external apparatus, and
control the display to display the state information of the external apparatus on the display,
wherein a first transducer from among the plurality of transducers is arranged to transmit an ultrasonic signal in a first direction, and a second transducer from among the plurality of transducers is arranged to transmit an ultrasonic signal in a second direction that is different from the first direction,
wherein a magnitude of ultrasonic signal transmitted by the at least one transducer is changed based on a number of active transducers of the plurality of transducers, and
wherein the state information of the external apparatus includes a charging state of the external apparatus or the remaining capacity of a battery of the external apparatus.

12. The device as claimed in claim 11, wherein the at least one processor is further configured to control the ultrasonic signal generator to:
determine whether an object is present on a path for transmitting the ultrasonic signal, and
upon determining that the object is present on the path, stop transmission of the ultrasonic signal.

13. The device as claimed in claim 12, wherein, when the at least one processor controls the ultrasonic signal generator to stop transmission of the ultrasonic signal, the at least one processor is further configured to control the display to display a user interface (UI) indicating that transmission of ultrasonic signal is stopped.

14. The device as claimed in claim 12, wherein the at least one processor is further configured to:
determine a backscattered signal is valid, and
determine that an object is present on the path when the backscattered signal is valid.

15. The device as claimed in claim 11, wherein the at least one processor is further configured to control the ultrasonic signal generator to transmit an ultrasonic signal to the external apparatus when the distance between the wireless power transmission device and the external apparatus is within a preset value.

16. The device as claimed in claim 11, wherein the at least one processor is further configured to identify the distance between the wireless power transmission device and the external apparatus using a time in which an ultrasonic signal generated from the wireless power transmission device reaches the external apparatus and a time in which an ultrasonic signal generated from the external apparatus reaches the wireless power transmission device.

17. The device as claimed in claim 11, wherein the at least one processor is further configured to:
generate an ultrasonic wave at a plurality of transmitters, and
identify the direction in which the external apparatus is positioned using a difference in time periods in which the plurality of generated ultrasonic waves reaches the external apparatus.

18. The device as claimed in claim 11, wherein the selected transducer is arranged in a direction corresponding to a position of the external apparatus among the plurality of transducers arranged in different directions.

19. The device as claimed in claim 11, wherein the ultrasonic signal generator is configured to convert an electric signal into an ultrasonic signal to generate an ultrasonic signal.

20. A method of a wireless charging system transmitting an ultrasonic signal, the method comprising:
identifying, by a wireless power transmission device, a direction in which an external apparatus is positioned and a distance between the wireless power transmission device and the external apparatus;
when a distance with the external apparatus is within a preset value, transmitting, by the wireless power transmission device, the ultrasonic signal to the external apparatus based on the direction in which the external apparatus is positioned and the distance between the wireless power transmission device and the external apparatus;
to based on the ultrasonic signal being received, converting, by the external apparatus, the ultrasonic signal into a charging voltage as an electric signal;
obtaining, by the wireless power transmission device, state information of the external apparatus using radio communication while the ultrasonic signal is transmitted to the external apparatus; and
displaying, by the wireless power transmission device, the state information of the external apparatus, wherein the wireless power transmission device comprises a plurality of transducers arranged in different directions,
wherein the transmitting, by the wireless power transmission device comprises:
    selecting, by the wireless power transmission device, at least one transducer, among the plurality of transducers, corresponding to the identified direction in which the external apparatus is positioned; and
    transmitting the ultrasonic signal using the selected at least one transducer in the identified direction in which the external apparatus is positioned,
wherein a first transducer from among the plurality of transducers is arranged to transmit an ultrasonic signal in a first direction, and a second transducer from among the plurality of transducers is arranged to transmit an ultrasonic signal in a second direction that is different from the first direction,
wherein a magnitude of ultrasonic signal transmitted by the at least one transducer is changed based on a number of active transducers of the plurality of transducers, and
wherein the state information of the external apparatus includes a charging state of the external apparatus or the remaining capacity of a battery of the external apparatus.

* * * * *